(12) United States Patent
Wang et al.

(10) Patent No.: US 10,338,207 B2
(45) Date of Patent: Jul. 2, 2019

(54) GATED RANGE SCANNING LFMCW RADAR STRUCTURE

(71) Applicant: Intelligent Fusion Technology, Inc, Germantown, MD (US)

(72) Inventors: Zhonghai Wang, Germantown, MD (US); XingPing Lin, Germantown, MD (US); Genshe Chen, Germantown, MD (US); Dan Shen, Germantown, MD (US); Bin Jia, Germantown, MD (US); Gang Wang, Germantown, MD (US); Khanh Pham, Germantown, MD (US); Erik Blasch, Rome, NY (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 413 days.

(21) Appl. No.: 15/344,365

(22) Filed: Nov. 4, 2016

(65) Prior Publication Data

US 2018/0329047 A1    Nov. 15, 2018

(51) Int. Cl.
*G01S 7/35* (2006.01)
*G01S 13/18* (2006.01)
*G01S 13/34* (2006.01)

(52) U.S. Cl.
CPC .............. *G01S 13/34* (2013.01); *G01S 7/354* (2013.01); *G01S 13/18* (2013.01); *G01S 13/343* (2013.01)

(58) Field of Classification Search
None
See application file for complete search history.

(56) References Cited

U.S. PATENT DOCUMENTS

| | | | | |
|---|---|---|---|---|
| 4,743,910 A | * | 5/1988 | Hill | G01S 13/584 342/159 |
| 4,983,979 A | * | 1/1991 | McKenzie | G01S 13/284 342/131 |
| 8,907,842 B1 | * | 12/2014 | Bianchini | H04B 1/525 342/159 |
| 2012/0146845 A1 | * | 6/2012 | Chen | G01S 13/34 342/200 |
| 2015/0070204 A1 | * | 3/2015 | Shirakawa | G01S 7/354 342/90 |
| 2017/0082756 A1 | * | 3/2017 | Parikh | G01S 19/37 |

* cited by examiner

*Primary Examiner* — Vladimir Magloire
*Assistant Examiner* — Donald H B Braswell
(74) *Attorney, Agent, or Firm* — Anova Law Group, PLLC

(57) ABSTRACT

The present disclosure provides a gated range scanning linear frequency modulated continuous wave (LFMCW) radar structure, including: a frequency synthesizer, a first mixer, a second mixer, a first filter, and a third mixer. The frequency synthesizer is configured for generating a first local oscillating signal and a second local oscillating signal, a frequency of the first local oscillating signal varying in a frequency range, each frequency corresponding to a sub-range of a coverage range scanned by the LFMCW radar structure. The first mixer is configured for mixing a copy of a transmitted signal and the first local oscillating signal to generate a first output signal (the receiver's first local oscillator). The second mixer is configured for mixing the first output signal and a received signal from a receiving antenna to generate a second output signal that includes an intermediate frequency (IF) signal being received by the first filter.

16 Claims, 2 Drawing Sheets

GATED RANGE SCANNING LFMCW RADAR STRUCTURE

GOVERNMENT RIGHTS

This invention was made with Government support under Contract No. N68335-15-C-0380, awarded by the United States Naval Air Systems Command (NAVAIR). The U.S. Government has certain rights in this invention.

FIELD OF THE DISCLOSURE

The disclosure generally relates to the field of radar technology, more particularly, relates to a gated range scanning linear frequency modulated continuous wave (LFMCW) radar structure with high sensitivity, a large coverage range, and a related method for range scanning.

BACKGROUND

Conventional linear frequency modulated continuous wave (LFMCW) radars include wideband-type radars and gated-type radars. A wideband LFMCW radar often covers a large distance range and has a wideband receiver. The wideband receiver often has a high noise floor. As a result, a wideband LFMCW radar often requires a high-power transmitter. A gated LFMCW radar often has a narrowband receiver, but it only covers a small distance range at any instance. The abovementioned issues limit the application of LFMCW radars.

BRIEF SUMMARY OF THE DISCLOSURE

The present disclosure provides a gated range scanning LFMCW radar structure with high sensitivity and a large coverage range, and a related method for range scanning. The disclosed LFMCW radar structure has improved sensitivity with high resolution; and only requires lower power to transmit radar signals compared to conventional LFMCW radars. Further, the disclosed LFMCW radar structure can be configured to cover a large range via range scanning.

The present disclosure provides a gated range scanning linear frequency modulated continuous wave (LFMCW) radar structure, including: a frequency synthesizer, a first mixer, a second mixer, a first filter, and a third mixer. The frequency synthesizer is configured for generating a first local oscillating signal and a second local oscillating signal, a frequency of the first local oscillator signal varying in a frequency range, each frequency corresponding to a sub-range of a coverage range scanned by the LFMCW radar structure. The first mixer is configured for mixing a copy of a transmitted signal and the first local oscillating signal to generate a first output signal (the receiver's first local oscillator). The second mixer is configured for mixing the first output signal and a received signal from a receiving antenna to generate a second output signal that includes an intermediate frequency (IF) signal being received by the first filter. The first filter is configured for generating a third output signal by filtering the second output signal and selecting a first frequency component to form the IF signal, a frequency of the IF signal corresponding to a sub-range of the coverage range scanned by the LFMCW radar structure. The third mixer is configured for mixing the second local oscillating signal and the third output signal to generate a fourth output signal that includes the baseband signal.

Optionally, the gated range scanning LFMCW radar structure further includes a second filter, configured for filtering out high frequency components from the fourth output signal and obtaining the baseband signal.

Optionally, the frequency synthesizer, the first mixer, the second mixer, the third mixer, the first filter, and the second filter form a double superheterodyne receiver structure.

Optionally, the first filter is a band-pass filter having a narrow passband and a steep skirt.

Optionally, the first frequency component of the second output signal falls between a lowest frequency of the pass band and a highest frequency of the pass band of the first filter, and other frequency components of the second output signal fall out of the pass band of the first filter.

Optionally, the frequency of the first local oscillating signal is of high stability.

Optionally, a frequency component outputted by the first mixer corresponds to a sub-range of the coverage range scanned by the LFMCW radar structure; a lowest frequency component corresponds to a farthest sub-range, and a highest frequency component corresponds to a closest sub-range.

Optionally, the LFMCW radar structure further includes: a transmitter, a radar data processor and controller, and a receiver, the receiver comprising the frequency synthesizer, the first mixer, the second mixer, the first filter, the second filter, and the third mixer.

Another aspect of the present disclosure provides a method of range scanning for a gated range scanning linear frequency modulated continuous wave (LFMCW) radar structure. The LFMCW radar structure includes a frequency synthesizer, a first mixer, a second mixer, a first filter, and a third mixer. The method includes: generating a first local oscillating signal and a second local oscillating signal, the frequency of the first local oscillating signal varying in a frequency range, each frequency corresponding to a sub-range of a coverage range scanned by the LFMCW radar structure; mixing a copy of the transmitted signal and the first local oscillating signal to generate a first output signal; mixing the first output signal and the amplified received signal from a receiving antenna to generate a second output signal having an intermediate frequency (IF) signal; generating a third output signal by filtering the second output signal and selecting a first frequency component to form the IF signal, a frequency of the IF signal corresponding to a sub-range of the coverage range scanned by the LFMCW radar structure; and mixing the second local oscillating signal and the third output signal to generate a fourth output signal, which includes the baseband signal.

Optionally, the method further includes: filtering out high frequency components from the fourth output signal through a second filter.

Optionally, the frequency synthesizer, the first mixer, the second mixer, the third mixer, the first filter, and the second filter form a double superheterodyne receiver structure.

Optionally, the first filter is a band-pass filter having a narrow passband and a steep skirt.

Optionally, the frequency of the IF signal falls in the pass band of the first filter, and other frequency components of the second output signal falls out of the pass band of the first filter.

Optionally, the frequency of the first local oscillating signal is of high stability.

Optionally, a lowest frequency outputted by the first mixer corresponds to a sub-range of the coverage range that is farthest to the LFMCW radar structure, and a highest frequency outputted by the first mixer corresponds to a sub-range of the coverage range that is closest to the LFMCW radar structure.

Optionally, the gated range scanning LFMCW radar further comprising: a transmitter, a radar data processor and controller, and a receiver, the receiver comprising the frequency synthesizer, the first mixer, the second mixer, the first filter, the second filter, and the third mixer.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

The present disclosure provides a gated range scanning linear frequency modulated continuous wave (LFMCW) radar structure. The key components of the LFMCW radar structure include a frequency synthesizer, a first mixer (i.e., the local oscillator generator mixer), a second mixer (i.e., the first receiver mixer), a first filter (i.e., the bandpass filter), and a third mixer (i.e., the second receiver mixer). The frequency synthesizer is configured to generate a first local oscillating signal and a second local oscillating signal. The frequency of the first local oscillating signal varies in a frequency range, and each frequency corresponds to a sub-range of the coverage range scanned by the LFMCW radar structure. The first mixer is configured to mix a copy of the transmitted signal and the first local oscillating signal to generate a first output signal (i.e., the first local oscillating signal). The second mixer is configured to mix the first output signal and the amplified received signal to generate a second output signal (including the intermediate frequency (IF) signal). The first filter is configured to generate a third output signal (i.e., the IF signal) by filtering the second output signal and selecting the first frequency component. The third mixer (i.e., the second receiver mixer) is configured to mix the second local oscillating signal and the third output signal to generate a fourth output signal, which includes the baseband signal.

Another aspect of the present disclosure provides a method for range scanning for the LFMCW radar. The range scanning method includes generating a first local oscillating signal and a second local oscillating signal (the frequency of the first local oscillating signal varies in a frequency range, and each frequency corresponds to a sub-range of the radar coverage range); mixing a copy of the transmitted signal and the first local oscillating signal to generate the first local oscillator signal; and mixing the first local oscillator signal and the amplified received signal from the receiving antenna to generate a second output signal including the IF signal. The method also includes generating a third output signal by filtering the second output signal and selecting the first frequency component, the first frequency component corresponds to a sub-range of the coverage range scanned by the LFMCW radar structure; and mixing the second local oscillator signal and the third output signal to generate a fourth output signal, which includes the baseband signal.

One aspect of the present disclosure provides a gated range scanning LFMCW radar structure with both high sensitivity and large coverage range via range scanning.

Figure 1:
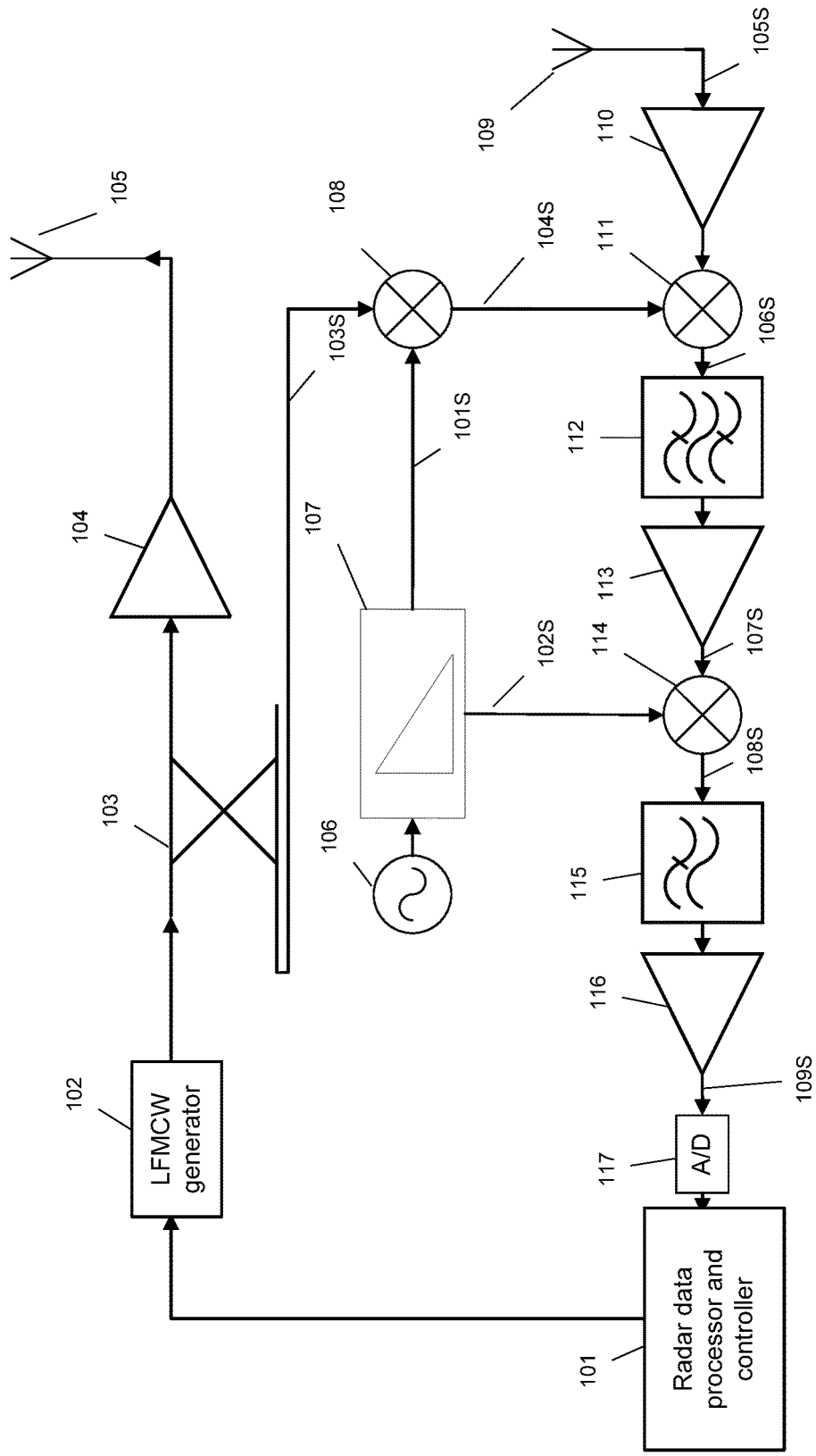
FIG. 1 illustrates an exemplary gated range scanning LFMCW radar structure with high sensitivity and large coverage range via range scanning consistent with the disclosed embodiments of the present disclosure; and, FIG. 2 illustrates a block diagram of a radar data processor and controller used in the disclosed embodiments of the present disclosure.

FIG. 1 illustrates an exemplary LFMCW radar structure provided by the present disclosure. As shown in FIG. 1, the LFMCW radar structure may include a radar data processor and controller 101, a transmitter, and a receiver.

The transmitter may include an LFMCW signal generator 102, a directional coupler 103, a power amplifier 104, and a transmitting antenna 105. The LFMCW signal generator 102 may generate a radar signal with a frequency of f(t). The directional coupler 103 may transmit a large portion of the radar signal to the power amplifier 104 and may couple a small part of the radar signal to the first mixer (108) to construct the first output (the first local oscillator signal). The transmitting antenna 105 may transmit the radar signal amplified by the power amplifier 104. The arrows in the transmitter indicate the directions signals are transmitted.

The receiver may include a high quality oscillator such as a temperature compensated crystal oscillator (TCXO) as frequency reference 106, a frequency synthesizer 107, a first mixer 108, a receiving antenna 109, a first amplifier 110 (the low noise amplifier), a second mixer 111, a first filter (the bandpass filter) 112, a second amplifier (IF amplifier) 113, a third mixer 114, a second filter (the low pass filter) 115, a third amplifier (baseband amplifier) 116, and an analog-to-digital converter 117.

As shown in FIG. 1, the receiver may have a double superheterodyne structure. The first stage of the double superheterodyne structure may convert the frequency of the signal received by the receiver to an intermediate frequency. The frequency synthesizer 107 may be configured to provide a first local oscillating signal 101S and select a desired frequency for the first local oscillating signal 101S such that the receiver may accordingly cover a desired sub-range of the radar coverage distance. The second stage of the double superheterodyne structure may convert the IF signal to a baseband signal. The first filter, being a band-pass filter, is applied to select signals within the desired intermediate frequency band and filter out undesirable signals such as noise and leakage signals from the transmitter. The LFMCW radar structure with the disclosed structure thus has improved sensitivity and the transmitter may only need to transmit a lower power radar signal. The arrows in the receiver indicate the directions the signals are transmitted.

The frequency reference 106 may generate a reference signal and the reference signal may be inputted into the frequency synthesizer 107. The frequency synthesizer 107, connected to and controlled by the radar data processor and controller 101, may generate a high-quality first local oscillating signal 101S. The first local oscillating signal 101S may have a frequency of $f_1(n)$, described in equation (1).

$$f_1(n) = f_{L0} + n \cdot df \qquad (1)$$

In equation (1), $f_{L0}$ may be the starting frequency of the frequency scanning, n may be the step index of the frequency scanning, and df may be the step size of the frequency scanning. The n may be a positive integer, e.g., n=1, 2, ..., and N. For each given n value, a value of $f_1(n)$ may be determined. The local oscillating signal 101S (frequency being $f_1(n)$) may be subsequently mixed with the transmitted radar signal and further mixed with the received signal to determine a desired IF component, which is further used to determine the range of coverage scanned by the LFMCW radar at each time. The frequency synthesizer 107 may be configured to scan a desired range of $f_1(n)$, e.g., by varying $f_{LO}$ and/or n, so as to ensure a desired corresponding sub-ranges of coverage that can be scanned by the LFMCW radar structure. According to equation (1), the desired range of coverage of the LFMCW radar structure may be divided into N sub-ranges. When n equals N, the LFMCW radar structure may be able to scan the sub-range that is closest to the LFMCW radar structure; and when n equals 1, the LFMCW radar structure may be able to scan the sub-range that is the farthest to the LFMCW radar structure. At each point of time, a value of $f_1(n)$ may be determined and one corresponding sub-range may be scanned. That is, by selecting a desired n value, a desired sub-range of coverage may be scanned.

The first local oscillating signal 101S and the second portion of the radar signal coupled by the directional coupler 103, shown and referred to as the coupled radar signal 103S, may be inputted into the first mixer 108 to generate a first output signal 104S. The first output signal 104S may include two main frequency components, i.e., $f(t)+f_1(n)$ and $f(t)-f_1(n)$.

The coupled radar signal 103S, having a frequency of $f(t)$, is mixed with the first local oscillating signal 101S at the first mixer 108 such that the frequency of the original radar signal is shifted to frequencies of: $f(t)+f_1(n)$ and $f(t)-f_1(n)$.

Meanwhile, radar signal transmitted by the transmitting antenna 105 may be reflected back by a target and received by the receiving antenna 109 as an echo signal. The frequency, $f_r(t)$, of the signal 105S received by the receiving antenna 109 may be described in equation (2).

$$f_r(t)=f(t+dt)+f_d \qquad (2)$$

In equation (2), $f_d$ may be the Doppler frequency due to the relative movements between the target and the LFMCW radar structure, dt may be the traveling time of the radar signal from transmitter to the target and then from the target to the receiver, and $f(t+dt)$ may represent the frequency of the radar signal at the time of t+dt, which is expressed in equation (3).

$$f(t+dt)=f(t)+k\cdot dt \qquad (3)$$

In equation (3), k may be the chirp rate. The received signal 105S may be amplified by the first amplifier 110. The amplified received signal and the first output signal 104S may be mixed at the second mixer 111, which is also referred to as the first downconverter. The output 106S of the second mixer 111 includes the desired IF signal. The frequencies of the two main components of the second output signal 106S are $f_{sm1-1}$ and $f_{sm1-2}$, which may be expressed in equations (4) and (5), respectively.

$$f_{sm1-1}=(f(t+dt)+f_d)+(f(t)+f_1(n))=2f(t)+k\cdot dt+f_1(n)f_d \qquad (4)$$

$$f_{sm1-2}=(f(t+dt)+f_d)-(f(t)-f_1(n))=f_{LO}+n\,df+k\,dt+f_d \qquad (5)$$

Further, the second output signal 106S, having two main components with frequencies of $f_{sm1-1}$ and $f_{sm1-2}$, may be inputted into the first filter 112. In one embodiment, the first filter 112 may be a narrow band-pass filter with a steep skirt. The pass band of the bandpass filter 112 may be sufficiently narrow such that the first filter 112 may minimize the impact of signals that are outside of the allowable frequency range defined by the first filter 112. Meanwhile, the frequency range defined by the first filter 112 may be designed to allow signals with proper frequencies to pass through such that a desired coverage range is obtained based on the passed signal. The above arrangement enables noise and leakage of the transmitter to be filtered out by the first filter 112 such that the receiver has high sensitivity. Accordingly, a transmitter with lower transmitting power may be used for obtaining a radar coverage range that is comparable with high power LFMCW radars.

The first filter 112 may be configured to filter out one frequency component of the IF signal and allow the other frequency component of the IF signal to pass through. In one embodiment, the frequency $f_{sm1-1}$ may fall out of the pass band of the first filter 112 so that one component of the second output signal 106S with the frequency of $f_{sm1-1}$ may undergo higher attenuation. That is, the component of the second output signal 106S with the frequency of $f_{sm1-1}$ may be filtered out by the first filter 112. In equation (5), n may have a proper value, i.e., $n=n_{pass}$, such that $f_{sm1-2}$ fall in the pass band of the first filer 112. Accordingly, the other main component of the second output signal 106S with the frequency $f_{sm1-2}$ undergoes desirably low attenuation. The relationship between the frequency $f_{sm1-2}$ and the pass band of the first filter 112 may be described in equation (6).

$$f_{bpl}<f_{LO}+n\cdot df+k\cdot dt+f_d<f_{bph} \qquad (6)$$

In equation (6), $f_{bpl}$ is the lower cutoff frequency of the first filter 112 and $f_{bph}$ is the higher cutoff frequency of the first filter 112. The value of n in equations (5) and (6) is in a desired range, i.e., $n=n_{pass}$, to satisfy the relationship shown in equation (6). When n is not in the desired range, i.e., $n \neq n_{pass}$, the component of the second output signal 106S with the frequency of $f_{sm1-2}$ may also have a high attenuation. In this case, the component of the second output signal 106S with the frequency of $f_{sm1-2}$ may not have sufficient amplitude for subsequent processing in the receiver. In other words, the output signal of the first filter 112 may only have one frequency component with sufficient amplitude for further processing and n should equal to $n_{pass}$. The frequency of the desired output signal selected by the first filter 112 may be expressed in equations (7) and (8).

$$f_{bp}(t)=f_{LO}+n_{pass}\cdot df+k\cdot dt+f_d \qquad (7)$$

$$(N-1)\cdot df<n_{pass}\cdot df+k\cdot dt+f_d<N\cdot df. \qquad (8)$$

The frequency range of the pass band of the first filter 112 may be between $(N-1)\cdot df$ and $N\cdot df$. In one embodiment, the first filter 112 may have a narrow band and a steep skirt, e.g., 70 dB of attenuation.

The output signal of the first filter 112 may be inputted to and amplified by the second amplifier 113. The output signal of the second amplifier 112 may be referred to as the third output signal 107S. The third output signal 107S, i.e., the amplified output signal of the first filter 112, may be inputted into the third mixer 114, also referred to as the second receiver mixer/downconverter. Meanwhile, the frequency synthesizer 107 may output a second local oscillating signal 102S to the third mixer 114. The frequency of the second local oscillating signal 102S may be a fixed value and expressed in equation (9).

$$f_2(t)=f_{LO}+(N-1)\cdot df \qquad (9)$$

The second local oscillating signal 102S and the third output signal 107S may be mixed at the third mixer 114 to generate a fourth output signal 108S. The third mixer 114 may convert the frequency of the third output signal 107S to a baseband signal by mixing the third output signal 107S with the second local oscillating signal 102S. The frequency of the fourth output signal 108S may include two main components. The two main components may be described in equations (10) and (11).

$$f_{bp}(t) + f_2(t) = (f_{L0} + n_{pass} \cdot df + k \cdot dt + f_d) + \qquad (10)$$
$$f_{L0} + (N-1) \cdot df)$$
$$= 2f_{L0} + (N - 1 + n_{pass}) \cdot df + k \cdot dt + f_d$$

$$f_{bp}(t) - f_2(t) = (f_{L0} + n_{pass} \cdot df + k \cdot dt + f_d) - \qquad (11)$$
$$f_{L0} + (N-1) \cdot df)$$
$$= (n_{pass} - N + 1) \cdot df + k \cdot dt + f_d$$

Because $(N-1) \cdot df < n_{pass} \cdot df + k \cdot dt + f_d < N \cdot df$, a relationship described in equation (12) may be obtained.

$$0 < (n_{pass} - N + 1) \cdot df + k \cdot dt + f_d < df \qquad (12)$$

The fourth output signal 108S may be inputted to the second filter 115. In one embodiment, the second filter 115, also referred to as a baseband filter, may be a low-pass filter. The components of the fourth output signal 108S with higher frequency may be filtered out by the second filter 115. The component of the fourth output signal 108S with the lower frequency expressed by equation (13), may pass the second filter 115 and may be transmitted to the third amplifier 116 to be amplified to form the fifth output signal 109S.

$$f_{bp}(t) - f_2(t) = (n_{pass} - N + 1) \cdot df + k \cdot dt + f_d \qquad (13)$$

The fifth output signal 109S may be inputted into the analog-to-digital converter 117 to be sampled and transformed to digital signals, which are further transmitted to the radar data processor and controller 101 for subsequent data processing. Further, results of the target range in the range scanning may be determined.

To select a desired $f_{bp}(t)$, a suitable value of $n_{pass}$ may be selected to satisfy the relationship shown in equation (13). That is, by selecting different $n_{pass}$ values, certain sub-ranges can be scanned. For example, a suitable $n_{pass}$ may be selected such that the LFMCW radar structure may scan a sub-range being closest, medium, or farthest to the LFMCW radar structure. The echo signal, reflected by the target, may be received by the receiver or the receiving antenna 109. The distance between the target and the LFMCW radar structure may be calculated with dt, which represents the time interval between when the radar signal transmits to the target from the transmitter and reflected back to the receiver form the target. In one embodiment, the frequency range of the pass band of the second filter may be from 0 to df, and the frequency of the output signal of the second filter 115 may be between 0 and df.

Another aspect of the present disclosure provides a method for range scanning for the gated range scanning LFMCW radar structure.

First, a first local oscillating signal and a second local oscillating signal may be generated, the frequency of the first local oscillating signal varying in a frequency range, each frequency corresponding to a sub-range of the radar coverage range.

Second, a portion of the transmitted signal and the first local oscillating signal may be mixed to generate a first output signal, which is the receiver's first local oscillator.

Third, the first output signal and the received signal may be mixed to generate a second output signal including an IF signal.

Fourth, a third output signal (the desired IF signal) may be selected by filtering the second output signal and selecting a first frequency component of the second output signal.

Fifth, the second local oscillating signal and the third output signal is mixed to generate a fourth output signal, which includes the baseband signal.

Figure 2:
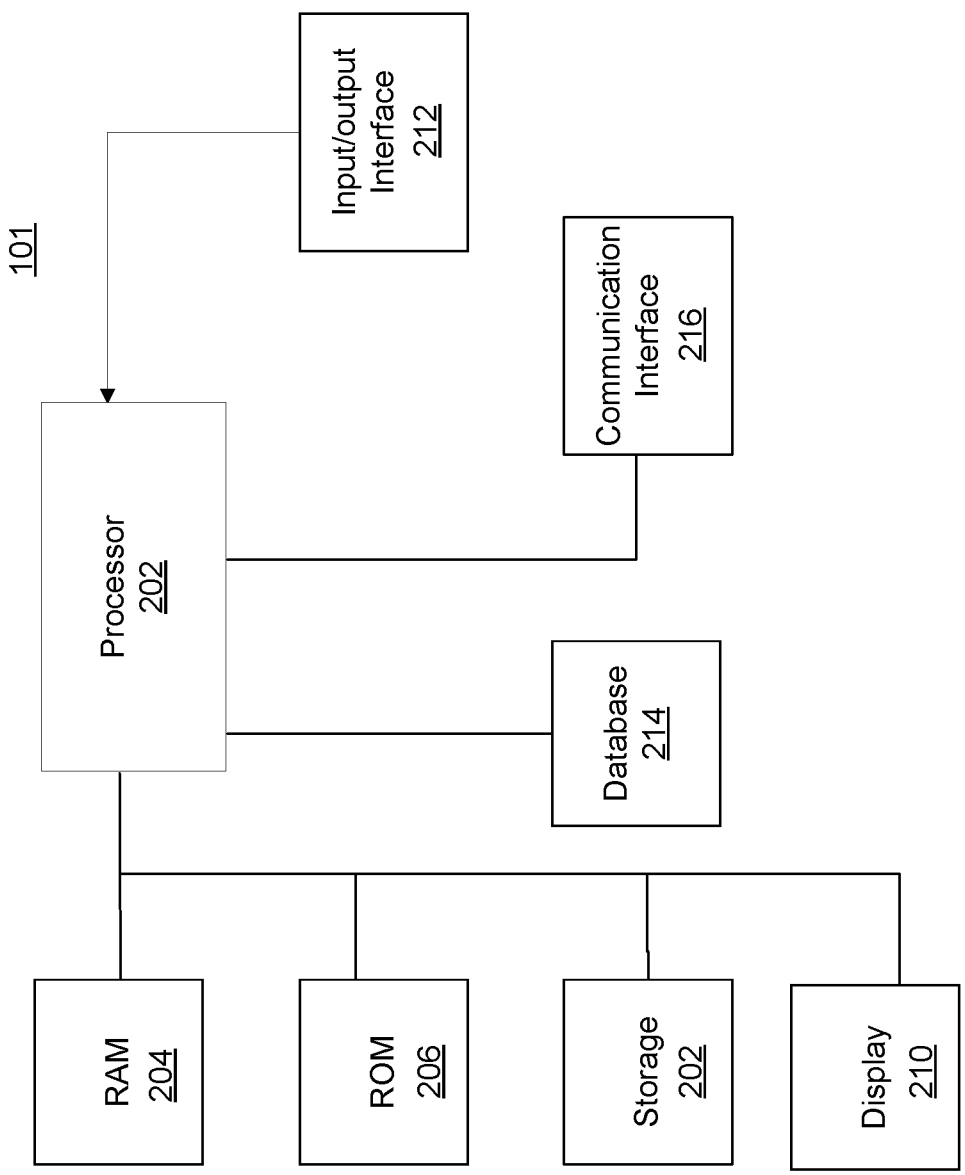

FIG. 2 illustrates the block diagram of a radar data processor and controller 101.

The radar data processor and controller 101 may receive, process, and execute commands from operator and the LFMCW radar structure. The radar data processor and controller 101 may be any appropriately configured computer system. As shown in FIG. 2, the radar data processor and controller 101 may include a processor 202, a random access memory (RAM) 204, a read-only memory (ROM) 206, a storage 208, a display 210, an input/output interface 212, a database 214, and a communication interface 216. Other components may be added and certain devices may be removed without departing from the principles of the disclosed embodiments.

Processor 202 may include any appropriate type of general purpose microprocessor, digital signal processor or microcontroller, and application specific integrated circuit (ASIC). Processor 202 may execute sequences of computer program instructions to perform various processes associated with radar data processor and controller 101. Computer program instructions may be loaded into RAM 204 for execution by processor 202 from read-only memory 206, or from storage 208. Storage 208 may include any appropriate type of mass storage provided to store any type of information that processor 202 may need to perform the processes. For example, storage 208 may include one or more hard disk devices, optical disk devices, flash disks, or other storage devices to provide storage space.

Display 210 may provide information to an operator of the radar data processor and controller 101. Display 210 may include any appropriate type of computer display device or electronic device display (e.g., cathode ray tube (CRT) or liquid crystal display (LCD) based devices). Input/output interface 212 may provide the operator the capability to input information into the radar data processor and controller 101 or for the operator to receive information from radar data processor and controller 101. For example, input/output interface 212 may include any appropriate input device, such as a keyboard, a mouse, an electronic tablet, voice communication devices, touch screens, or any other optical or wireless input devices. Further, input/output interface 212 may receive from and/or send to other external devices.

Further, database 214 may include any type of commercial or customized database, and may also include analysis tools for analyzing the information in the databases. Database 214 may be used for storing information for semiconductor manufacturing and other related information. Communication interface 216 may provide communication connections such that radar data processor and controller 101 may be accessed remotely and/or communicate with other systems through computer networks or other communication networks via various communication protocols, such as transmission control protocol/internet protocol (TCP/IP), hypertext transfer protocol (HTTP), etc.

In one embodiment, an operator may input commands through the input/output interface 212 to start range scanning. The processor 202 may receive, process, and execute the commands to start the detection process. The communication interface may receive the digital signals transmitted by the analog-to-digital converter 117 and send the received data to ROM 206 and storage 208 to be stored and further processed. After the data is processed, result of the range scanning can be obtained. The result can be returned to the operator via the display 210 or the input/output interface 212.

The present disclosure provides a gated range scanning LFMCW radar structure for both high sensitivity and large coverage range via range scanning. The disclosed LFMCW radar structure may have a double superheterodyne receiver structure, which includes the application of the second mixer and the third mixer. The disclosed LFMCW radar structure may further include a frequency synthesizer, a first mixer, and a first filter in the receiver to scan sub-ranges with higher sensitivity and less noise. The transmitter may require less power to obtain long coverage range.

The frequency synthesizer may be configured to provide a first local oscillating signal with high stability and change the frequency of the first local oscillating signal such that the receiver may scan a desired sub-range of the coverage range. A plurality of sub-ranges may be scanned consecutively such that the LFMCW radar structure may scan a large range of coverage in total. By using the frequency synthesizer, only one band-pass filter is need for scanning the coverage range. In one embodiment, by changing the frequency of the first local oscillating signal, the range of the covered distance scanned by the LFMCW radar structure may also be changed.

Further, the first mixer may be a local oscillator generator. The first mixer may mix the coupled radar signal with the first local oscillating signal. The output signal of the first mixer may be mixed with the received radar signal by the second mixer to generate a second output signal including the desired IF signal. The second output signal may include two main frequency components, and only one frequency component may be allowed to pass the first filter. The first filter may be a narrow band-pass filter with a steep skirt. The first filter may allow one component of the second output signal having the desired intermediate frequency to pass through and filter out undesired signals such as noise and leakage signals. The output signal of the first filter may be amplified to obtain a third output signal. Thus, the signal transmitted and processed in the receiver may include lower noise, and the receiver may have improved sensitivity. Accordingly, the transmitter may require a lower power to transmit the radar signal.

Further, the frequency synthesizer may further generate a second local oscillating signal. The second local oscillating signal and the third output signal may be mixed in the second mixer to generate a fourth output signal. The fourth output signal may be filtered by the second filter, which may be a low-pass filter, to generate a baseband signal. The baseband signal may be sampled and processed to obtain the range scanning results.

Compared with the traditional LFMCW radars, the disclosed LFMCW radar structure may require much less power for signal transmission because of the high-sensitive receiver. Optionally, a transmitter with low/medium power can satisfy the requirement of a large coverage range. Meanwhile, because the scanning of a plurality of sub-ranges may be performed to cover a large total range, signal transmission and processing in the disclosed receiver may undergo some delays. The disclosed LFMCW radar structure may be applied in applications that are not critical on response time, such as unmanned aerial system (UAS), to detect, localize and avoid targets such as hot balloon, small manned aerial vehicle, unmanned aerial vehicle, etc.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A gated range scanning linear frequency modulated continuous wave (LFMCW) radar structure, comprising:
    a frequency synthesizer, a first mixer, a second mixer, a first filter, and a third mixer, wherein:
    the frequency synthesizer is configured for generating a first local oscillating signal and a second local oscillating signal, a frequency of the first local oscillator signal varying in a frequency range, each frequency corresponding to a sub-range of a coverage range scanned by the LFMCW radar structure;
    the first mixer is configured for mixing a copy of a transmitted radar signal and the first local oscillating signal to generate a first output signal, corresponding to receiver's first local oscillating signal;
    the second mixer is configured for mixing the first output signal and a received signal from a receiving antenna to generate a second output signal that includes an intermediate frequency (IF) signal being received by the first filter;
    the first filter is configured for generating a third output signal by filtering the second output signal and selecting a first frequency component to form the IF signal, a frequency of the IF signal corresponding to a sub-range of the coverage range scanned by the LFMCW radar structure; and the third mixer is configured for mixing the second local oscillating signal and the third output signal to generate a fourth output signal that includes a baseband signal.

2. The gated range scanning LFMCW radar structure further comprising a second filter, configured for filtering out high frequency components from the fourth output signal and obtaining the baseband signal.

3. The gated range scanning LFMCW radar structure according to claim 2, wherein the frequency synthesizer, the first mixer, the second mixer, the third mixer, the first filter, and the second filter form a double superheterodyne receiver structure.

4. The gated range scanning LFMCW radar structure according to claim 1, wherein the first filter is a band-pass filter having a narrow passband and a steep skirt.

5. The gated range scanning LFMCW radar structure according to claim 4, wherein the first frequency component of the second output signal falls between a lowest frequency of the pass band and a highest frequency of the pass band of the first filter, and other frequency components of the second output signal fall out of the pass band of the first filter.

6. The gated range scanning LFMCW radar structure according to claim 1, wherein the frequency of the first local oscillating signal is of high stability.

7. The gated range scanning LFMCW radar structure according to claim 1, wherein a frequency component outputted by the first mixer corresponds to a sub-range of the coverage range scanned by the LFMCW radar structure; a lowest frequency component corresponds to a farthest sub-range, and a highest frequency component corresponds to a closest sub-range.

8. The gated range scanning LFMCW radar structure according to claim 2, further comprising:
    a transmitter, a radar data processor and controller, and a receiver, the receiver comprising the frequency synthesizer, the first mixer, the second mixer, the first filter, the second filter, and the third mixer.

9. A method of range scanning, using a gated range scanning linear frequency modulated continuous wave (LFMCW) radar structure, the gated range scanning LFMCW radar structure comprising a frequency synthesizer, a first mixer, a second mixer, a first filter, and a third mixer, the method comprising:

generating a first local oscillating signal and a second local oscillating signal, a frequency of the first local oscillating signal varying in a frequency range, each frequency corresponding to a sub-range of a coverage range scanned by the LFMCW radar structure;

mixing a copy of a transmitted radar signal and the first local oscillating signal to generate a first output signal;

mixing the first output signal and an amplified received signal from a receiving antenna to generate a second output signal having an intermediate frequency (IF) signal;

generating a third output signal by filtering the second output signal and selecting a first frequency component to form the IF signal, a frequency of the IF signal corresponding to a sub-range of the coverage range scanned by the LFMCW radar structure; and mixing the second local oscillating signal and the third output signal to generate a fourth output signal, which includes a baseband signal.

10. The method according to claim 8, further comprising: filtering out high frequency components from the fourth output signal and obtaining the baseband signal through a second filter.

11. The method according to claim 10, wherein the frequency synthesizer, the first mixer, the second mixer, the third mixer, the first filter, and the second filter form a double superheterodyne receiver structure.

12. The method according to claim 10, wherein the first filter is a band-pass filter having a narrow passband and a steep skirt.

13. The method according to claim 12, wherein the frequency of the IF signal falls in the pass band of the first filter, and other frequency components of the second output signal falls out of the pass band of the first filter.

14. The method according to claim 10, wherein the frequency of the first local oscillating signal is of high stability.

15. The method according to claim 10, wherein a lowest frequency outputted by the first mixer corresponds to a sub-range of the coverage range that is farthest to the LFMCW radar structure, and a highest frequency outputted by the first mixer corresponds to a sub-range of the coverage range that is closest to the LFMCW radar structure.

16. The method according to claim 10, wherein the gated range scanning LFMCW radar further comprising: a transmitter, a radar data processor and controller, and a receiver, the receiver comprising the frequency synthesizer, the first mixer, the second mixer, the first filter, the second filter, and the third mixer.

\* \* \* \* \*